United States Patent
Chiu et al.

(10) Patent No.: US 10,229,085 B2
(45) Date of Patent: Mar. 12, 2019

(54) FIBRE CHANNEL HARDWARE CARD PORT ASSIGNMENT AND MANAGEMENT METHOD FOR PORT NAMES

(71) Applicant: HEWLETT PACKARD ENTERPRISE DEVELOPMENT LP, Houston, TX (US)

(72) Inventors: Evan Chiu, Cary, NC (US); Jason M. Fox, Cary, NC (US)

(73) Assignee: Hewlett Packard Enterprise Development LP, Houston, TX (US)

(*) Notice: Subject to any disclaimer, the term of this patent is extended or adjusted under 35 U.S.C. 154(b) by 386 days.

(21) Appl. No.: 14/967,143

(22) Filed: Dec. 11, 2015

(65) Prior Publication Data
US 2016/0217098 A1 Jul. 28, 2016

Related U.S. Application Data

(60) Provisional application No. 62/107,324, filed on Jan. 23, 2015.

(51) Int. Cl.
*G06F 13/42* (2006.01)
*G06F 3/06* (2006.01)
*G06F 13/40* (2006.01)

(52) U.S. Cl.
CPC .......... *G06F 13/426* (2013.01); *G06F 3/0604* (2013.01); *G06F 3/0632* (2013.01); *G06F 3/0665* (2013.01); *G06F 3/0689* (2013.01); *G06F 13/4068* (2013.01)

(58) Field of Classification Search
None
See application file for complete search history.

(56) References Cited

U.S. PATENT DOCUMENTS

| 6,976,118 B1 | 12/2005 | Baier |
| 7,424,416 B1 | 9/2008 | Cavanagh et al. |
| 7,607,005 B1 | 10/2009 | Lewis |

(Continued)

FOREIGN PATENT DOCUMENTS

CN 105354162 A 2/2016

OTHER PUBLICATIONS

Cyrod Technologies, Inc., "PCI Express Expansion Backplane," (Research Paper), 2008, 3 pages, http://www.cyrod.com/Templates/PCI_express_expansion_backplane.htm.
Herr, J. et al., "Hot Swapping the PCI Bus—Design Note 155," (Research Paper), 2015, 2 pages, available at http://cds.linear.com/docs/en/design-note/dn155fa.pdf.

(Continued)

*Primary Examiner* — Idriss N Alrobaye
*Assistant Examiner* — Dayton Lewis-Taylor
(74) *Attorney, Agent, or Firm* — Hewlett Packard Enterprise Patent Department

(57) ABSTRACT

Systems and methods for managing name assignments in a Fiber Channel (FC) storage arrays are provided. One example method includes receiving a port name for a slot of a controller of the FC storage array. The slot of the controller is configured to receive an FC card for providing communication between the FC storage array and an FC fabric. The method includes binding the port name to the slot of the controller, and the port name is saved to a database managed by the controller. The method further includes assigning the port name to the FC card when installed in the slot. The FC card is swappable with other FC cards, and thus other FC card will also maintain the port name of the slot.

20 Claims, 7 Drawing Sheets

(56) References Cited

U.S. PATENT DOCUMENTS

| | | |
|---|---|---|
| 7,836,238 B2 | 11/2010 | Freimuth et al. |
| 7,877,521 B2 | 1/2011 | Suzuki et al. |
| 7,934,033 B2 | 4/2011 | Malwankar |
| 8,417,774 B2 | 4/2013 | Flynn et al. |
| 8,443,126 B2 | 5/2013 | Elboim |
| 8,782,317 B1 | 7/2014 | Du |
| 8,949,502 B2 | 2/2015 | McKnight et al. |
| 9,262,363 B2 | 2/2016 | Luo et al. |
| 2007/0043882 A1 | 2/2007 | Natarajan et al. |
| 2007/0233928 A1 | 10/2007 | Gough |
| 2010/0262979 A1 | 10/2010 | Borchers et al. |
| 2012/0185634 A1* | 7/2012 | Shirai .................. G06F 13/385 710/316 |
| 2012/0198110 A1 | 8/2012 | Wang et al. |
| 2014/0365704 A1 | 12/2014 | Yousuf |
| 2015/0095712 A1 | 4/2015 | Han |
| 2015/0286602 A1 | 10/2015 | Buckland et al. |
| 2016/0048192 A1 | 2/2016 | Matsunaga et al. |
| 2017/0126487 A1 | 5/2017 | Xie et al. |

OTHER PUBLICATIONS

InterNational Committee for Information Technology Standards (INCITS), "INCITS 513-201x, Information technology—SCSI Primary Commands—4 (SPC-4)," Jun. 3, 2014, Revision 37, <https://standards.incits.org/apps/group_public/download.php/57039/eb-2014-00339-Public-review-register-INCITS-513-201x-Comments-due-7-21-2014.pdf>.

Jahangiri, A., "PCI Express Hot Plug: A New Era of RAS," (Research Paper), Jul. 2, 2007, 4 pages, http://electronicdesign.com/boards/pci-express-hot-plug-new-era-ras.

Linear Technology, "LTC1421—Hot Swap Controller," Jan. 31, 2017, (web page), <http://www.linear.com/product/LTC1421>.

Linear Technology, "LTC1421/LTC1421-2.5 Hot Swap Controller," 1996, <http://cds.linear.com/docs/en/datasheet/1421fc.pdf>.

Wikipedia, "Field-programmable gate array," May 17, 2017, <https://en.wikipedia.org/w/index.php?title=Field-programmable_gate_array&oldid=780855960>.

Wikipedia, "PCI Express," May 26, 2017, <https://en.wikipedia.org/w/index.php?title=PCI_Express&oldid=782336068>.

\* cited by examiner

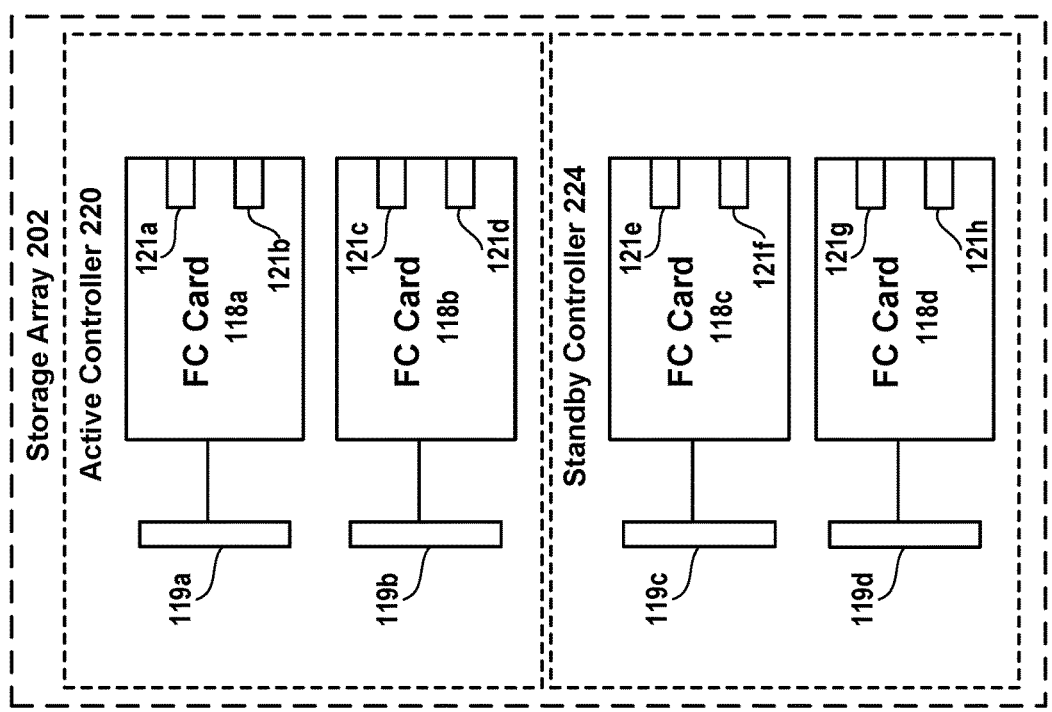

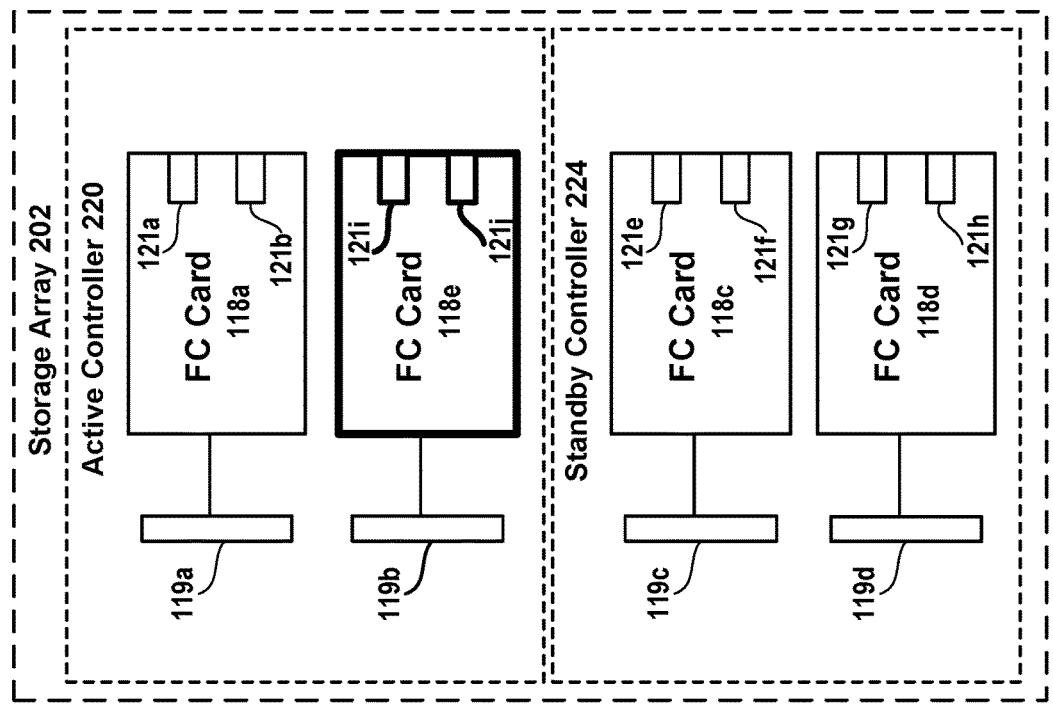

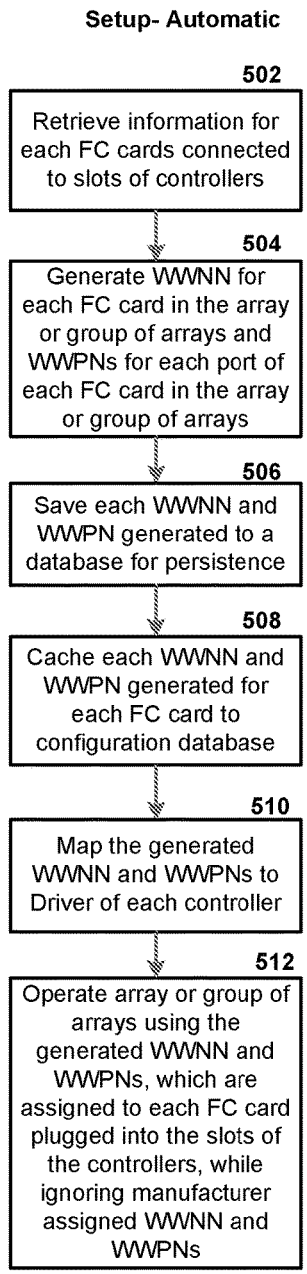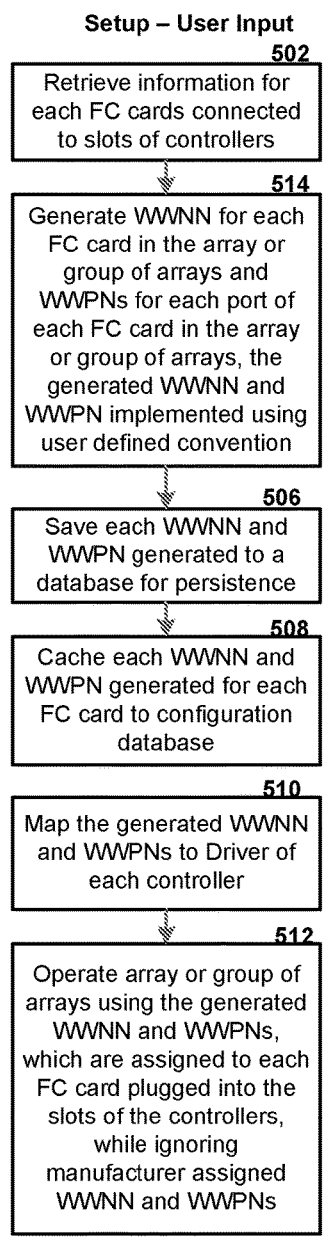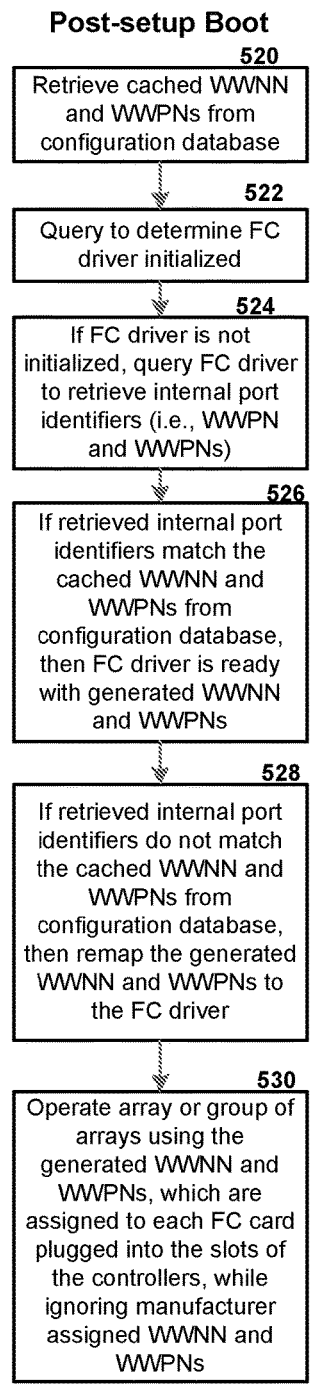
Fig. 5A
Fig. 5B
Fig. 5C

FIBRE CHANNEL HARDWARE CARD PORT ASSIGNMENT AND MANAGEMENT METHOD FOR PORT NAMES

CLAIM OF PRIORITY

The present application claims priority as a nonprovisional of U.S. Provisional Application No. 62/107,324, filed on Jan. 23, 2015, and entitled "Fibre Channel Hardware Card Port Assignment and Management Method for Port Numbers," which is herein incorporated by reference.

FIELD OF DISCLOSURE

Embodiments of the disclosure provide for storage systems and methods that enable efficient configuration of port names assigned to hardware cards installed in such storage systems.

BACKGROUND

Storage arrays, also referred to as network storage systems or storage systems, provide connected computer data storage to heterogeneous clients connected over a network. Typically storage arrays process a large amount of Input/Output (IO) requests for applications, are highly available, and require adequate network connection speeds. As is known, there are various networking standards used by storage arrays. Today, storage arrays most commonly utilize iSCSI or Fibre Channel (FC) communication protocols. Depending on end user applications, legacy infrastructure, and other considerations, one or the other protocol is selected.

If the Fibre Channel protocol is selected, the storage array, switches, hosts and other infrastructure will adhere to standard Fibre Channel conventions. These Fibre Channel conventions need to be managed to ensure proper interoperability. In Fibre Channel storage array configurations, there is a responsibility to properly generate, assign and manage World Wide Node Names (WWNNs) and World Wide Port Names (WWPNs) within a storage array, a pool of storage arrays, a group of storage arrays, etc. Typically, a storage array is assigned a WWNN, and ports of the storage array are assigned WWPNs. Typically, Fibre Channel (FC) cards that are connected to ports of the storage array are manufactured with their own WWPN, and this WWPN is used for the hardware configuration of the storage array. This process works, however, sometimes after the storage array is configured onto a fabric, there is a need to change the FC card. When this happens, the new swapped-in FC card will come with its own WWPN, which then will require reconfiguration of the fabric, e.g., fabric switches. Unfortunately, reconfiguration requires extra management and may be prone to human error.

It is in this context that embodiments arise.

SUMMARY

Embodiments of the disclosure provide for systems and methods that enable efficient configuration of port names assigned to hardware cards installed in such systems. The systems that benefit from such configuration include storage arrays that operate using the Fibre Channel (FC) standard. The efficient assignment of port names enable, in some configurations, the ability to swap hardware cards while keeping originally assigned port names of the storage array. In one embodiment, the port names are World Wide Port Names (WWPNs), which are assigned to specific physical slots of a controller of a storage array. By way of example, instead of using WWPNs assigned to FC cards that connect to physical slots of the controller, the physical slots of the controller retain an assigned WWPN, regardless of the WWPN assigned to the FC card. By maintaining this assignment, it is possible to swap or replace FC cards in storage arrays without having to reconfigure other devices in the FC fabric. This advantage reduces management, reduces the introduction of human error and simplifies ongoing management of a FC fabric.

In one embodiment, a method for generating a node name and port names for a storage array is provided. The method includes retrieving information for Fibre Channel (FC) cards connected to slots that provide access to a bus of a controller of the storage array. The method also includes identifying ports for the FC cards connected to the slots and generating node name for the FC cards connected to the slots of the storage array and generating a plurality of port names for each of the ports of the FC cards. The method is configured to assign the generated node name and each of the plurality of port names to a driver that manages communication between the FC cards and the controller. The assignment of the generated node name and port names enables maintaining the assignment for any FC card that may be connected to the slots.

In another embodiment, a method for managing name assignments in a Fibre Channel (FC) storage array is provided. The method includes receiving a port name for a slot of a controller of the FC storage array. The slot of the controller is configured to receive an FC card for providing communication between the FC storage array and an FC fabric. The method includes binding the port name to the slot of the controller, and the port name is saved to a database managed by the controller. The method further includes assigning the port name to the FC card when installed in the slot. The FC card is swappable with other FC cards, and thus other FC card will also maintain the port name of the slot.

In another embodiment, a storage array is provided. The storage array includes a controller that is configured for Fibre Channel (FC) operation. The controller has a slot for receiving a FC card. The FC card is configured to enable network communication between the storage array and a FC fabric. The controller is associated with a driver that manages assignment of a port name for the slot. The port name when assigned to the slot is configured to override an original port name assigned to the FC card. The assignment of the port name to the slot enables swapping of the FC card with other FC cards. The driver is configured to maintain the port name the same for the FC card and other FC cards that are inserted into the slot of the controller.

BRIEF DESCRIPTION OF THE DRAWINGS

FIGS. 4B-4C illustrate an example of the storage array having an active controller and a standby controller, and generated WWNs, in accordance with some embodiments.

FIGS. 4D-4E illustrates how an FC card has been replaced with another FC card, in accordance with some embodiments.

FIG. 5A illustrates a flowchart describing methods associated with the setup process for automatically generating and assigning WWNN and WWPNs in a storage array, or storage arrays that may be configured as a group, in accordance with some embodiments.

FIG. 5B illustrates an embodiment where user input can be received to define the numbering/naming convention assigned to each of the ports when generated by the daemons executing on the storage array or group of storage arrays, in accordance with some embodiments.

FIG. 5C illustrates an example of a post set up boots of a storage array, in accordance with one embodiment.

DETAILED DESCRIPTION

The following embodiments describe methods, devices, systems, and computer programs for storage arrays, which are configured for network connectivity in accordance with one or more protocols.

In one embodiment, Fibre Channel (FC) cards installed in a storage array are manufactured with a World Wide Node Name (WWNN), and the ports with World Wide Port Names (WWPNs). Embodiments described herein include systems and methods for generating WWNN and WWPNs that remain persistent and bound to a storage array or group of storage array after generation, regardless of changes in FC cards installed therein or swapped in or out over time.

As mentioned above, one available protocol is iSCSI (Internet Small Computer System Interface). iSCSI is used for interconnecting storage arrays to a network, which enables the transport of SCSI commands over Ethernet connections using TCP/IP (i.e., for IP networks). In such configurations, an iSCSI storage implementation can be deployed using Ethernet routers, switches, network adapters, and cabling.

Another protocol is Fibre Channel. Fibre Channel is a high-speed network technology, which is primarily utilized in storage area networks (SANs). Storage arrays are the target devices in a SAN configuration, wherein the fabric and initiators all intercommunicate using the Fibre Channel protocol. Fibre Channel Protocol (FCP) is a transport protocol (similar to TCP used in IP networks) that predominantly transports SCSI commands over Fibre Channel networks.

In accordance with various embodiments described herein, a storage array configurable for Fibre Channel mode or iSCSI mode is provided. The storage array can include logic and hardware to operate in the iSCSI mode and can implement one or more Ethernet cards. To operate in the Fibre Channel mode, the storage array is provided with a Fibre Channel (FC) card (e.g., a hardware card of the controller). The FC card is the link between the Fibre Channel physical network (i.e., PHY) and the Fibre Channel (FC) driver of the storage array for connecting to the FC fabric.

Figure 1A:
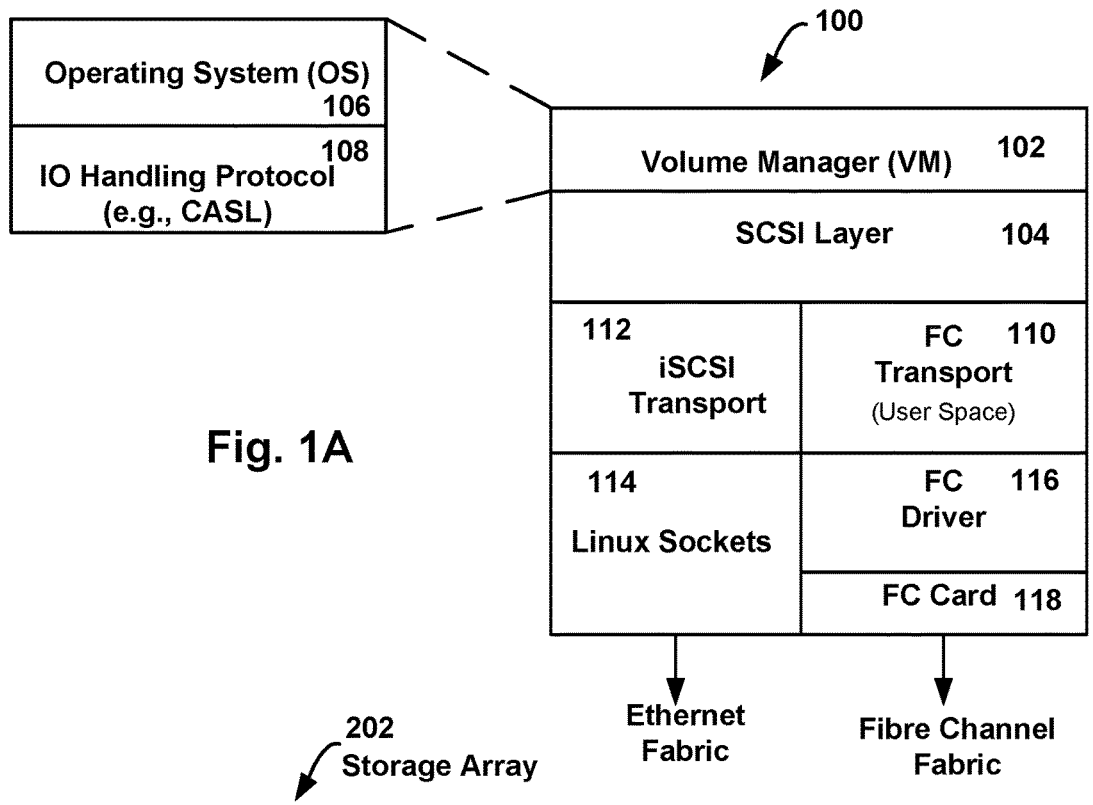
FIG. 1A provides one example view of a storage array SCSI target stack, in accordance with one embodiment.

FIG. 1A provides one example view of a storage array SCSI target stack 100. The stack includes a volume manager (VM) 102, which broadly includes the operating system (OS) 606 of the storage array and an IO handling protocol that processes read and write IO commands to storage of the storage array. The IO handling protocol, in one embodiment, is referred to herein as a cache accelerated sequential layout (CASL) process, which intelligently leverages unique properties of flash and disk of the storage array to provide high performance and optimal use of capacity. CASL functions as the file system of the array, albeit processing is generally performed at the block level instead of file level.

Below the VM 102 is a SCSI layer 104, which is configured to handle SCSI commands. In one embodiment, the SCSI layer 104 has been implemented to be independent of iSCSI transport functionality. For example, in storage arrays configured for pure iSCSI mode operation, the iSCSI transport 112 may include logic that is shared by the SCSI layer 104. However, to implement a Fibre Channel operating storage array, the SCSI layer 104 has been implemented to remove dependencies on the iSCSI transport 112. The SCSI target stack 100 further includes a Fibre Channel (FC) transport 110, which functions as user space for running various processes, which are referred to herein as daemons. The user-space of the FC transport 110 serves as the conduit to the SCSI target (i.e., SCSI layer 104).

A Fibre Channel (FC) driver 116 is further provided, which is in communication with a Fibre Channel (FC) card 118. In one embodiment, in order to interact with the FC card 118, which is a dedicated hardware/firmware, a dedicated FC driver 116 is provided. For each FC card 118 (i.e., port) in an array, an instance of the FC driver 116 is provided. The FC driver 116 is, in one embodiment, a kernel level driver that is responsible for interacting directly with the FC card 118 to retrieve incoming SCSI commands, request data transfer, and send SCSI responses, among other things. In one embodiment, the FC card 118 may be an adapter card, which includes hardware, firmware and software for processing Fibre Channel packets between the Fibre Channel fabric and the FC driver. In one specific example, the FC card 118 may be a Fibre Channel Host Bus Adapter (HBA) card, available from Emulex Corporation, located in Costa Mesa, Calif. If the storage array is configured for iSCSI mode, Linux sockets are used to communicate with a TCP/IP network interface card (NIC), for communication with an Ethernet fabric.

Figure 1B:
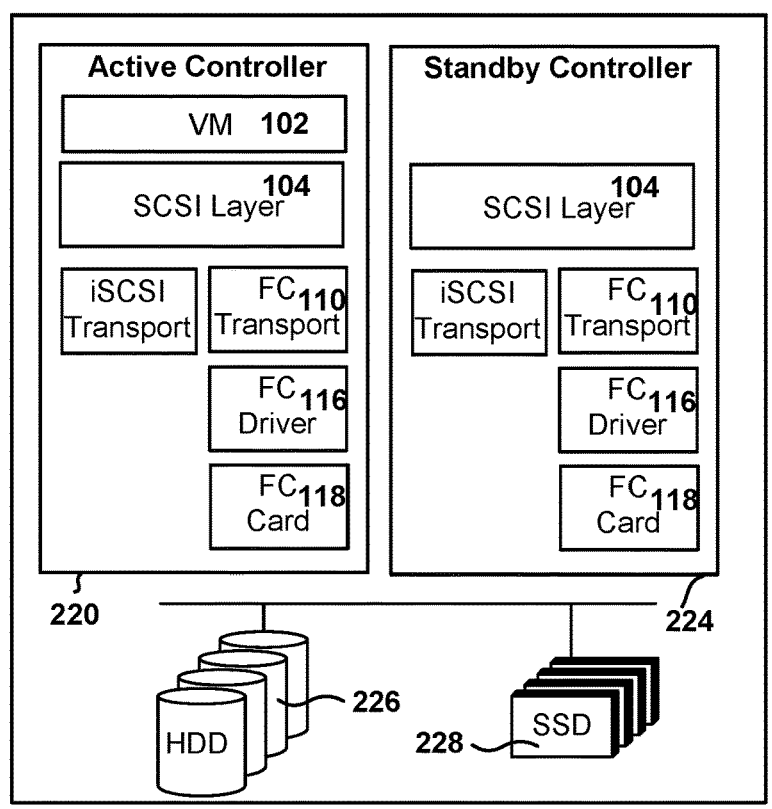
FIG. 1B illustrates an example of a storage array, which includes an active controller, a standby controller, and storage (i.e., hard disk drives (HDDs), and solid state drives (SSDs)), in accordance with one embodiment.

FIG. 1B illustrates an example of a storage array 202, which includes an active controller 220, a standby controller 224, and storage (i.e., hard disk drives (HDDs) 226, and solid state drives (SSDs) 228). This configuration shows the storage array SCSI target stack 100 usable in each of the active and standby controllers 220 and 224, depending on the state of operation. For example, if the active controller 220 is functioning normally, the standby controller is not serving IOs to and from the storage, and ports of the standby controller are simply operational in a standby (SB) state in accordance with an asymmetric logical unit access (ALUA) protocol. The ALUA protocol is described in more detail in a Fibre Channel standard, entitled "*Information technology—SCSI Primary Commands—4 (SPC-4)*", revision 36s, dated 21 March, 2014 (Project T10/BSR INCITS 513), which is incorporated herein by reference. Generally speaking, ALUA is a multi-pathing method that allows each port (e.g., Linux-IO Target) to manage access states and path attributes using assignments that include: (a) active/optimized (AO); (b) active/non-optimized (ANO); (c) standby (SB); unavailable (UA); and (d) logical block dependent (LBD).

In the example of FIG. 1B, it is noted that the standby controller 224 may not have the iSCSI transport 112 during the time it operates as a "standby" controller. If failover occurs and the standby controller 224 becomes the active controller 220, then the iSCSI transport 112 will be populated. Note also, that during Fibre Channel operation, the FC transport 110 is the module that is in operation. Alternatively, if the storage arrays are used in an iSCSI configuration, the iSCSI transport 112 will be needed, along with the Linux Sockets 114 to enable Ethernet fabric communication.

Figure 2:
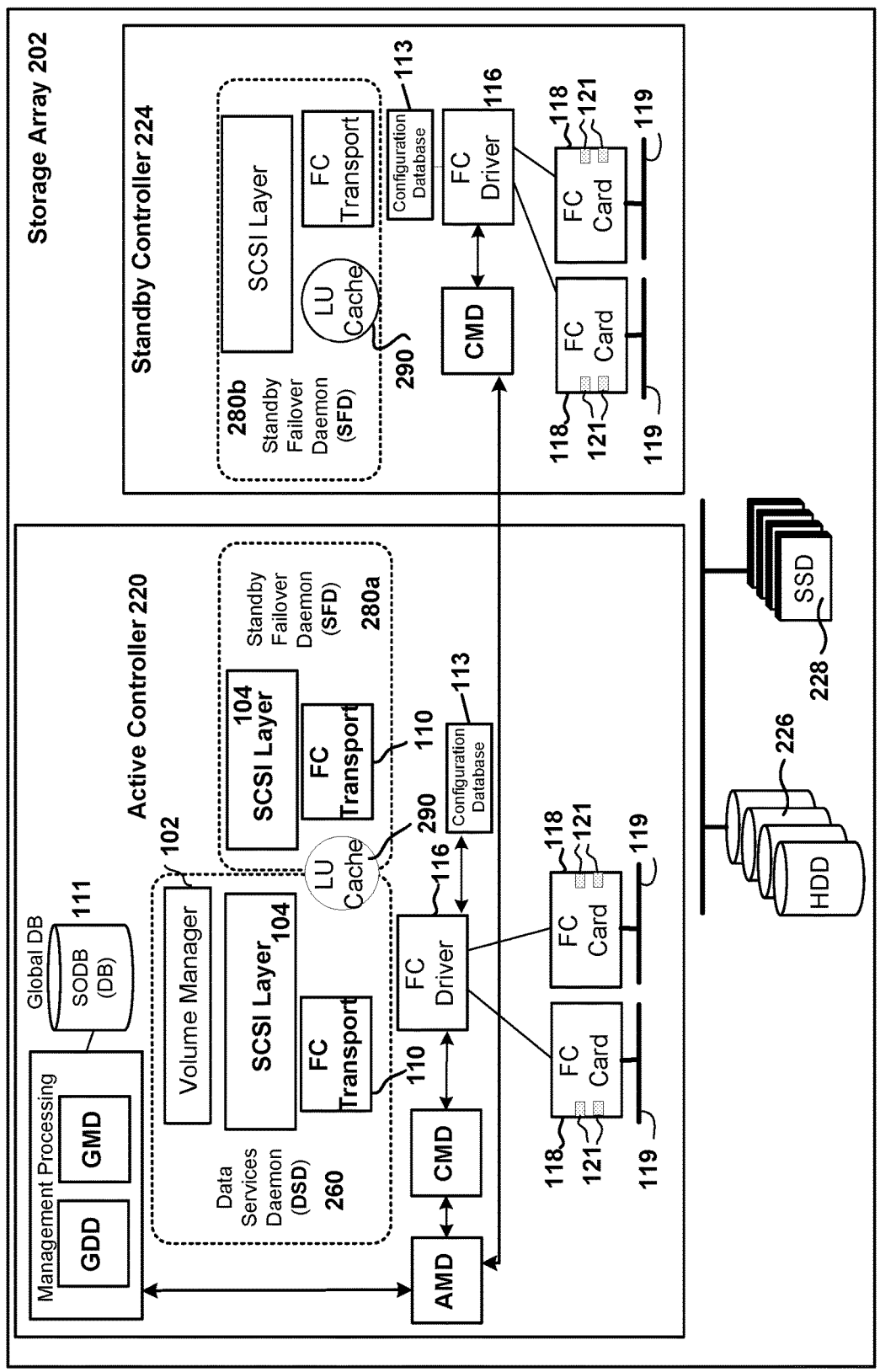
FIG. 2 shows an example of the active controller, which is configured with a data services daemon (DSD), in accordance with one embodiment.

FIG. 2 shows an example of the active controller 220, which is configured with a data services daemon (DSD) 260. DSD 260 is designed to provide full access to the storage array 202 via the VM 102, which includes serving IOs to the volumes of the storage array 202 (e.g., in response to initiator access requests to the SCSI target storage array 202). The DSD 260 of the active controller 220 is a user space process. For failover capabilities within the active controller 220 itself, the user space of the active controller 220 also includes a standby failover daemon (SFD) 280a. The SFD 280a is configured as a backup process that does not process IOs to the volumes of the storage array 202, but can provide limited services, such as responding to information SCSI commands while the DSD 260 is re-started (e.g., after a crash). If the SFD 280a takes over for the DSD 260, the I_T Nexus (i.e., connection) between initiators and the target array remain un-terminated.

The standby controller 224 of the storage array 202 is also configured with an SFD 280b in its user space. As noted above, the ports of the standby controller 224 are set to standby (SB) per ALUA. If a command is received by the SFD of the standby controller, it can process that command in one of three ways. In regard to a first way, for many commands, including READ and WRITE, the SCSI standard does not require the target to support the operation. For this case, SFD 280b returns the SCSI response prescribed by the standard to indicate non-support. In a second way, among the mandatory-to-support SCSI commands, there are certain commands for which initiators expect quick response under all conditions, including during failover.

Examples include, without limitation, INQUIRY, REPORT_LUNS, and REPORT_TARGET_PORT_GROUPS. For these commands, SFD 280b responds locally and independently. In a third way, for other mandatory-to-support SCSI commands (such as PERSISTENT_RESERVATION_IN/OUT), the SFD 280b will depend on the DSD 260 process running on the active controller 220. Thus, a forwarding engine is used to forward SCSI commands from the standby controller 224 to the active controller 220. The active controller 220 will process the commands and send responses back to the standby controller 224, which will in turn send them to the initiator.

For commands that need to be processed locally, all information required to create an accurate and consistent SCSI response will be stored locally in an LU cache 290. In one embodiment, a logical unit (LU) cache will be present on each of the active and standby controllers 220/224, and consistency methods ensure that all LU cache states are updated. The SFD 280a/b uses the LU cache 290 to independently respond to a small number of commands, such as Inquiry, Report LUNs and RTPG.

Furthermore, in Fibre Channel, each FC transport endpoint is identified by a Fibre Channel (FC) World Wide Node Name (WWNN) and World Wide Port Name (WWPN), or generally referred to as World Wide Name (WWN). It is customary and expected that all ports for a given target advertise the same single WWNN. The client OS storage stack will establish a single FC connection to each available FC transport endpoint (WWNN/WWPN pair). Since FC requires a separate WWNN/WWPN pair for each target, the single-LUN target model would require a separate WWNN/WWPN pair for each exported volume. In the example of storage array 202, it may have two FC transport endpoints for each of the active controller 220 and the standby controller 224. That is, the active controller 220 may have two ports (i.e., two WWNN/WWPN pairs), and the standby controller 224 may also have two ports (i.e., two WWNN/WWPN pairs). It should be understood that the configuration of the storage array 202 may be modified to include more or fewer ports.

For an FC configuration, because there are multiple LUNs accessible through an SCSI I_T nexus, and there is no free-format "target name" into which lookup information can be embedded, logical unit number (LUN) mapping is maintained for each initiator. The LUN mapping is configured to persistently store the mapping information and maintain consistency across reboots. The LUN mapping is stored in the LU cache 290. The DSD 260 and SFD 280a and 280b are provided with direct access to the LU cache 290. The LU cache 290 will also store inquiry data and port state information. In one embodiment, a GDD (Group Data Daemon) and a GMD (Group Management Daemon) will maintain LUN mapping information for each initiator. GDD and GMD are management processing for configuring the storage array 202 and for maintaining settings and configurations during operation. GDD, from SCSI perspective, is configured to work with SCSI layer 104 to handle SCSI Reservation and TMF (task management function). In one embodiment, GDD will support iSCSI login and connection re-balancing for when the storage array 202 is configured/used as an iSCSI target.

A Fibre Channel (FC) card installed in a storage array is manufactured with a World Wide Node Name (WWNN). This configuration works, however, sometimes after the array is configured onto a fabric, when there is a need to change the FC card 118. When this happens, the WWNN will change, which requires reconfiguration at the fabric switches and/or parts of the FC fabric. In one configuration shown in FIG. 2, each of the active controller 220 and standby controller 224 have two slots 119 coupled to a bus onto which FC cards 118 connect (i.e., four FC cards 118 per storage array 202). An FC card 118 can have one or more ports 121. In a specific example, each FC card 118 has two ports 121 and each port has a World Wide Port Name (WWPN).

In one embodiment, during initialization, a driver process of each controller 220 and 224 in the array 202 will assign a WWPN for each FC port, based on the slot 119 in which the FC card 118 resides, and the port number 121 on the FC card 118. If another FC card 118 is later plugged into the same slot 119, then during subsequent system initialization the same WWPN will be assigned to that card's ports 121. In this manner, no matter which FC card 118 is plugged into the slot 119, the WWPNs assigned to the ports 121 accessed through that slot 119 will maintain their binding. This is true even if a controller's FC cards 118 are replaced, rearranged, or added. By assigning WWPNs based on slot 119 (i.e., where FC cards 118 are plugged into) and port number with a slot 119, it is possible to ignore the WWPN given to the FC card 118 by the manufacturer and this also ensures that the fabric zoning to ports 121 of the storage array remain unchanged when FC cards 118 are changed and/or upgraded and/or swapped.

In accordance with one embodiment, the WWPN assigned to a slot will be persistent. In other words, if an HBA or even the entire controller is replaced, the WWPNs should not change. To maintain the assignments of WWPNs, a database 111 will be used to store (e.g., configdb 113 for cache access) the WWPNs and their associations with a port id (e.g., port #/controller id/array id). In one embodiment, the WWNN will persist for the lifetime of the group/target. The database 111 will be used to store (configdb 113 for cache access) the WWNNs and their associations with a group/target.

If the port# is the internal port identifier returned by the FC driver (assigned in a repeatable, predictable fashion), then after a FC card 118 or controller swap the same WWPNs would still be presented to the fabric. In one embodiment, this internal port identifier should be tied to the slot 119, e.g., PCIe slot. By enabling this configuration, nearly all other maintenance operations (e.g., replacing a host bus adapter (HBA) card (i.e., FC card 118), replacing one controller for another that has the HBA installed in the same PCIe slot, etc.) will result in no change of the internal port identifiers. In one embodiment, each FC card 118 is a dual 16GbFC card (i.e., including two ports 121). In other embodiments, when quad FC cards 118 (i.e., including four ports 121) are used, the numbering system for internal port identifiers would be changed to accommodate the four ports per PCIe slot. Still further, the numbering system could reserve a large enough (e.g., 4 or 8) port numbers per PCIe slot to accommodate larger cards in the future.

In one configuration, if a storage array 202 boots and setup have not yet been executed, then WWNN and WWPNs will not have been generated. Therefore, the FC driver 116 will not be able to complete port initialization. It should, however, be able to respond to calls about the physical hardware (e.g., number of ports, etc.).

Still referring to FIG. 2, to complete setup, the process will flow to the Group Management Daemon (GMD). If a group of arrays have been configured as a pool, the GMD will query the relevant array to retrieve FC port 121 information. If the storage array 202 is not part of a pool, then GMD will simply query the FC ports 121 of the storage array. In one embodiment, this query is made via a call that is made into the Array Management Daemon (AMD) and then each Controller Management Daemon (CMD) and then into libplatfc. In the present context, "libplatfc" is a library that provides user space processes (e.g., CMD) an API to interact with the FC driver 116. At this point, GMD will generate the WWNN and WWPNs. GMD will persist the WWNs to SODB (i.e., a database 111). GMD will push the WWNs to the ports via AMD and then each CMD. CMD will cache the WWNs in configdb 113. At this point, CMD will notify the FC driver 116 of the WWNs (via libplatfc).

In one embodiment, the following is an example of post-setup boot and detecting FC hardware. In a post-setup boot, CMD will retrieve the existing mapping of WWNN/WWPN to internal port identifiers (via configdb). If the data is not present in configdb, then the FC driver will not be able to complete port initialization. This represents an error condition in the post-setup boot scenario, as the data should have been saved in configdb during setup. Next, CMD will query the FC driver 116 to determine if it has already been initialized (i.e., would be true if CMD restarts).

If the FC driver 116 is not yet configured, CMD will query the FC driver 116 to retrieve the internal port identifiers (via libplatfc) and will provide the WWNs to the FC driver 116 (via libplatfc). If the FC driver 116 configuration matches that in configdb, then no further action is required. If the FC driver configuration does not match that in configdb, then this represents an error condition (e.g., perhaps a crash in CMD halfway through driver initialization). In this case, the system will attempt to repair the configuration. Installing additional FC cards 118 will require a manual post-install step to configure the new card(s). This configuration step will assign new WWPNs and allow the FC driver 116 to bring the new ports online.

In one embodiment, group membership operations also account for assignment of WWPNs. Since the WWNN will be group-scoped, management operations that modify the group membership will have to modify WWNNs and WWPNs. For example, an array added to a group will add an uninitialized array to a group. The WWNN of the existing group will be used and new WWPNs will be generated for the added array. If an array is removed from a group, the array must not be assigned to a pool and therefore will not contain any volumes. It will, however, still have a WWNN and WWPNs. Once the array is removed from the group, it returns to the uninitialized state. Therefore, during the array remove, the WWNN and WWPN should be stripped for this array in the SODB as well as the configdb. In the case of a group merge, e.g., merge of two groups of arrays, the joining group will need to be assigned the WWNN of the target group. And new WWPNs should be generated for all the ports in the joining group.

In one embodiment, the assignment of WWNN and WWPN will use the "registered" IEEE Network Address Authority 5 format. For NAA 5 format, there are 9 contiguous nibbles (36 bits) for a vendor-defined value. The NAA 5 format includes 4 bits=0101; 24 bit OUI=6C:9C:E9 (e.g., Manufacturer OUI assigned to Nimble Storage); and 36 bit vendor sequence or serial number. Using the NAA 5 format, 36 bits are available, for a maximum of 68,719,476,736 possible unique values.

Figure 3:
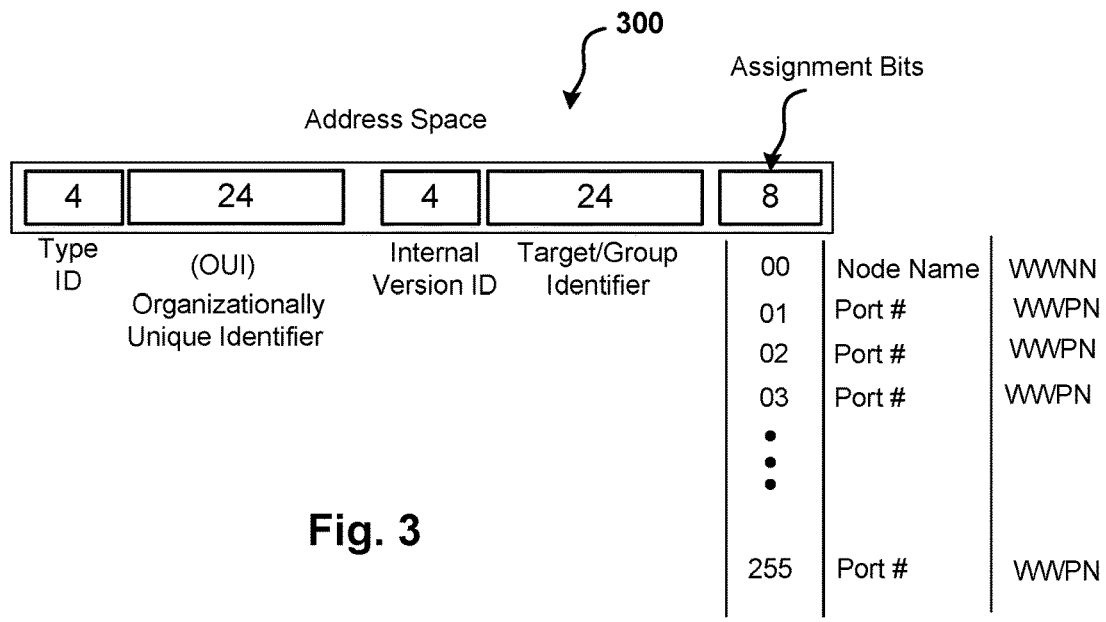
FIG. 3 illustrates that enable backward compatibility and format changes, in accordance with one embodiment.

As shown in FIG. 3, to enable backward compatibility and (internal) format changes, address space has a configuration structure 300 with nine (9) contiguous nibbles (36 bits) for a vendor-defined value, which includes an internal version identifier. The illustrated configuration structure 300 shows 4 bits for an internal version identifier (16 distinct values), 24 bits for a target/group identifier (16,777,216 distinct values), 8 bits for port identifiers (255 distinct values). Within a given WWNN, the final 8 bits are used to create distinct WWPNs. However, the preceding 24 bits are the "Target/Group Identifier" and it these 24 bits that make the WWNN distinct from other WWNNs. This configuration allows up to 16 different internal formats for how to use the remaining 32 bits. In one embodiment, the name 00 is assigned to the WWNN of the FC card. If there are multiple FC cards in an array, all cards will share the same WWNN. If the array is part of a group of arrays, all FC cards in each array will have the same WWNN. However, the generated WWPN is unique for each port number of each FC card.

In the example of FIG. 2, both the active controller 220 and the standby controller 224 will have two FC cards 118. For the four FC cards 118, there will be eight ports 121. In one embodiment, the generation of the WWPNs will assign port names, for each FC card 118 connected to a slot 119, in order. In regard to the generation of the last 8 bits of configuration 300, the left FC card 118 of the active controller 220 will get port names 01, and 02, the right FC card 118 of the active controller 220 will get port names 03, and 04, the left FC card 118 of the standby controller 224 will get names 05, and 06, and the right FC card 118 of the standby controller 224 will get names 07, and 08. If the storage array 202 were part of a group, then the assignment of ports would continue incrementally, e.g., up to 255 ports.

In another embodiment, it is possible to get user input that will define a different naming convention or custom convention. In some embodiments, by allowing users to provide a naming convention for an array configuration, it is possible for the end user to configure the network or fabric using the names that will later be generated for the array or group of arrays. Whether the system generates WWPNs automatically as an automated process, in an incremental manner or using custom user input (e.g., providing custom names and/or numbers), the generated WWPNs will be saved to a database 111/113 for use. Thus, each time the storage array is in use, the assigned WWNN and WWPNs will be implemented for any FC card 118 plugged into the slots 119 of the controllers. As noted above, this configuration will ignore the WWNN and WWPNs assigned to the FC cards by the manufacturers of the FC cards.

Figure 4A:
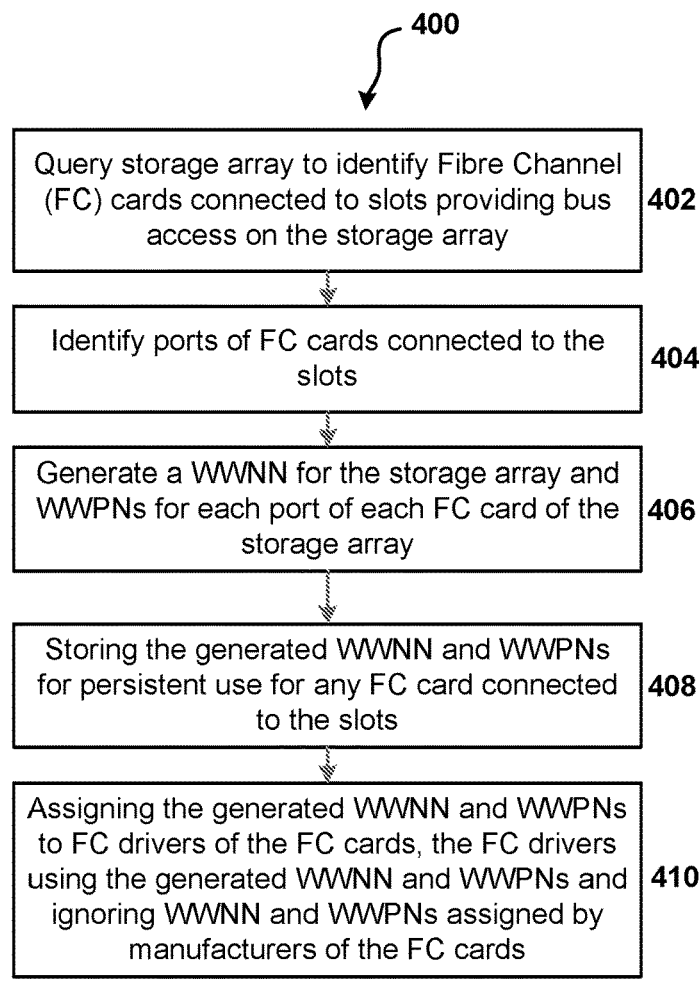
FIG. 4A is a flowchart that defines method operations used to assign WWNs in accordance with one embodiment.

FIG. 4A is a flowchart 400 that defines method operations used to assign WWNs in accordance with one embodiment. In operation 402, the storage arrays queried to identify FC cards connected to slots that provide bus access on the storage array. The FC cards have connectors that provide an interface to the storage, such as the hard disk drives 226 and the solid-state drives 228 illustrated in FIG. 1B and FIG. 2. The connectors of the FC card defined the ports and commonly the manufacturer of the FC card will have assigned a WWNN to the FC card and WWPNs to each of the ports of the FC card. In accordance with one embodiment, the assigned WWNN and WWPNs are ignored by the storage array and instead new WWNN and WWPNs are generated and linked to the slots 119 providing bus access on each controller of the storage array 202.

In operation 404, the ports of the FC cards connected to the slots are identified. As described above, a program executing on the storage array 202 can be configured to query the FC cards connected to the storage array 202 and obtain identification of which slots to which the FC cards are connected and also identify the ports of the FC cards. In operation 406, a program executing on the storage array 202 will generate a WWNN for the storage array 202 and WWPNs for each port of each FC card of the storage array 202. It should be noted that every FC card on the storage array 202 will now have a globally assigned an identical WWNN, which defines the storage array 202 as a target having an identifiable and single WWNN irrespective of the FC cards connected to the slots 119. Additionally, the generation of the WWPNs of each port on each FC card can take on various configurations, such as incrementally assigning port numbers using the last 8 bits of the configuration 300, as shown in FIG. 3.

As will be described below, is also possible for user input to be provided which will customize the numbering scheme used to assign port numbers, and their associated WWPNs. This allows for configuration personnel to know in advance the naming scheme utilize for particular storage, such that a network can be configured ahead of time, e.g., before the WWNN and WWPNs are generated. That is, the generated WWNN and WWPNs will later be generated using the predefined naming scheme provided by the user input, instead of an incremental naming scheme which is shown in FIG. 3. In either configuration, the generated WWNN and WWPNs will be stored in operation 408 to a database 111 and configuration database 113 so that any FC card connected to the slots 119 will inherit the preassigned and pre-generated WWNN and WWPNs.

As described above, the storage array 202 may maintain a global database 111 in which the configuration information associated with the generated WWNN and WWPNs can be stored, and the system can maintain this assignment throughout its use and even when FC cards are removed or replaced over time. In operation 410, the generated WWNN and WWPNs are assigned to the drivers of the FC cards, such that the drivers will manage communication storage devices connected thereto, e.g., hard drives and solid-state drives. As noted above, the originally assigned WWNN and WWPNs by the manufacturers of the FC cards is ignored and not utilized in establishing the interconnections of the fabric that includes the storage array 202.

FIGS. 4B-4C illustrate an example of the storage array 202 having an active controller 220 and a standby controller 224, and generated WWNs. In FIG. 4B, FC cards 118*a-b* are plugged into slots 119*a-b* of the active controller 220. FC cards 118*c-d* are plugged into slots 119*c-d*. FC card 118*a* includes ports 121*a* and 121*b*. FC card 118*b* includes ports 121*c* and 121*d*. FC card 118*c* includes ports 121*e* and 121*f*. FC card 118*d* includes ports 121*g* and 121*h*. In one embodiment, FIG. 4C illustrates the generation of the WWNN that will apply to all of the cards connected to the storage array 202, as well as the individually generated WWPNs for each of the ports on each of the cards connected to the slots of the FC cards 118. It is noted that the assignment of the generated WWNN and the WWPNs is with regard to the slots 119 of the storage array 202. For this reason, if any one of the cards is replaced with another card having other ports, the slot into which the new card will be plugged into will then have its ports assigned to the same generated WWPNs.

FIGS. 4D-4E illustrates how FC card 118*b* has been replaced with FC card 118*e*. It is also shown that FC card 118*e* has ports 121*i-j*, which is different than the ports of FC card 118*b*. In the table of FIG. 4E, it is also shown that the replacement of FC card 118*b* with FC card 118*e* has been incorporated into the previously assigned and generated WWPNs, which remain the same as those that were previously generated. In this embodiment, slot 119*b* remains mapped to the generated WWPNs, so that any card that is connected to the slot 119*b* will inherit the previously generated WWPNs. As noted above, the generated WWNs are stored locally to the FC card in a configuration database 113 (i.e., accessible by the FC driver 116), and also stored globally in a database 111 associated with the management of the storage array 202.

FIG. 5A illustrates a flowchart describing methods associated with the setup process for automatically generating and assigning WWNN and WWPNs in a storage array 202, or storage arrays that may be configured as a group. The assigning, in part, acts to bind the port names to the slots of the controller. In operation 502, the storage array 202, implementing at least one program or daemon that executes to manage the storage array 202, will execute instructions to retrieve information for each of the FC cards connected to the slots of the controllers. As described in reference to FIG. 2, this retrieval of information can include utilizing the Group Management Daemon (GMD) which communicates with the Array Management Daemon (AMD). AMD is tasked with communicating with the Controller Management Daemon (CMD) of each controller. It should be appreciated that each of these daemons are simply programs executing on the storage array 202. These programs can be, in some embodiments combined into a single program or divided into additional programs, so long as the functionality of communication with the drivers 116 of each of the controllers in the storage array 202 is facilitated. In operation 502, one or more of these programs will therefore retrieve information regarding which FC cards are connected to which slots of the storage controller 202.

In operation 504, generation of the WWNN for each FC card in their array will be generated, as well as WWPNs for each of the ports of each of the FC cards connected to the slots. As noted above, each one of the FC cards connected to the slots of the storage array 202 will be given the same WWNN. If the storage array 202 is part of a group of storage arrays, then each of the FC cards in each of the grouped storage arrays will also be given the same WWNN, which defines the target. Again, if a group of storage arrays is created, the WWPNs assigned to each of the FC cards in each of the storage arrays will be generated, e.g., by consecutively incrementing the number assigned to the port as shown in FIG. 3 (i.e., using the last 8 bits).

In operation 506, each of the generated WWNN and WWPNs is saved to a database 111 for persistent storage. In operation 508, each of the generated WWNN and WWPN are also cached in association with the configuration of each FC card in a local configuration database 113. In this manner, locally storing the configurations in association with the FC cards and their driver will allow for local configuration or access to the configuration. It is also possible to confirm whether the configuration is the same as that stored in the persistent database 111 from time to time, or when a discrepancy is detected.

In operation 510, the generated WWNN and WWPNs are mapped to the driver of each of the controllers for association with the FC cards that are connected to the respective slots. In operation 512, the array is allowed to operate individually or as a group using the generated WWNN. Additionally, the generated WWPNs are utilized in association with the FC cards of the storage array while ignoring the manufacturers assigned WWNN and WWPNs.

FIG. 5B illustrates an embodiment where user input can be received to define the numbering convention assigned to each of the ports when generated by the daemons executing on the storage array 202 or group of storage arrays. In this example, operation 502 is similar to that of FIG. 5A. In operation 514, the daemons executing on the storage array 202 will generate a WWNN for each of the FC cards in the array or group of arrays. Similarly, the daemons executing on the storage array 202 will generate WWPNs for each of the ports of each of the FC cards connected to the array or arrays. In this embodiment however the generation of the WWNN and WWPN can take on a custom or user defined numbering/naming scheme. For instance, instead of starting the generated WWNN at 00, it may start at 42, and WWPNs, can begin at 43, 44, 45, etc.

By enabling user input during setup, it is possible for administrators to predefine the ordering at which the assigned WWNN and WWPNs will be generated, so that later configuration of the storage array 202 or group of storage arrays into a fabric can be custom integrated and the numbering and naming conventions can be instantly utilized. If pre-configuration with user input is not necessary, the system will automatically generate the WWNN and WWPNs for the storage array 202, such as by starting with a number for the WWNN and incrementing for each identified ports that will be assigned consecutive WWPNs. In either configuration, the system will ignore the manufacturer assigned WWNNs and WWPNs, and instead utilize the generated WWNs.

FIG. 5C illustrates an example of a post set up boots of a storage array 202, in accordance with one embodiment. In operation 520, the cached WWNN and WWPN of the storage array are retrieved from the configuration database 113, or the global database 111. In operation 522, a query is made to the FC drivers to determine whether they have been initialized utilizing specific WWNN and WWPNs. Once the data regarding the initialization has been received, the method moves to operation 524 were it is determined that the FC driver is not initialized. In this case, the FC driver is queried to retrieve the internal port identifiers, i.e., WWNN and WWPNs. If the retrieved internal port identifiers match the cached WWNN and WWPNs in operation 526, then the FC driver is ready with the appropriate WWNN and WWPNs that were previously assigned during setup.

In operation 528, if the retrieved internal port identifiers do not match the cached WWNN and WWPNs from the configuration database 113, then it is necessary to remap the generated WWNN and WWPNs to the FC driver, which may be obtained from the global database 111. At this point, the locally cached configuration database 113 will also be updated to include the appropriate WWNN and WWPNs that match those in the global database 111. In operation 530, the array can now be operated using the generated WWNN and WWPNs, which were assigned to each FC card plugged into the slots of the controllers, while ignoring the manufacturer assigned WWNN and WWPNs.

Figure 6:
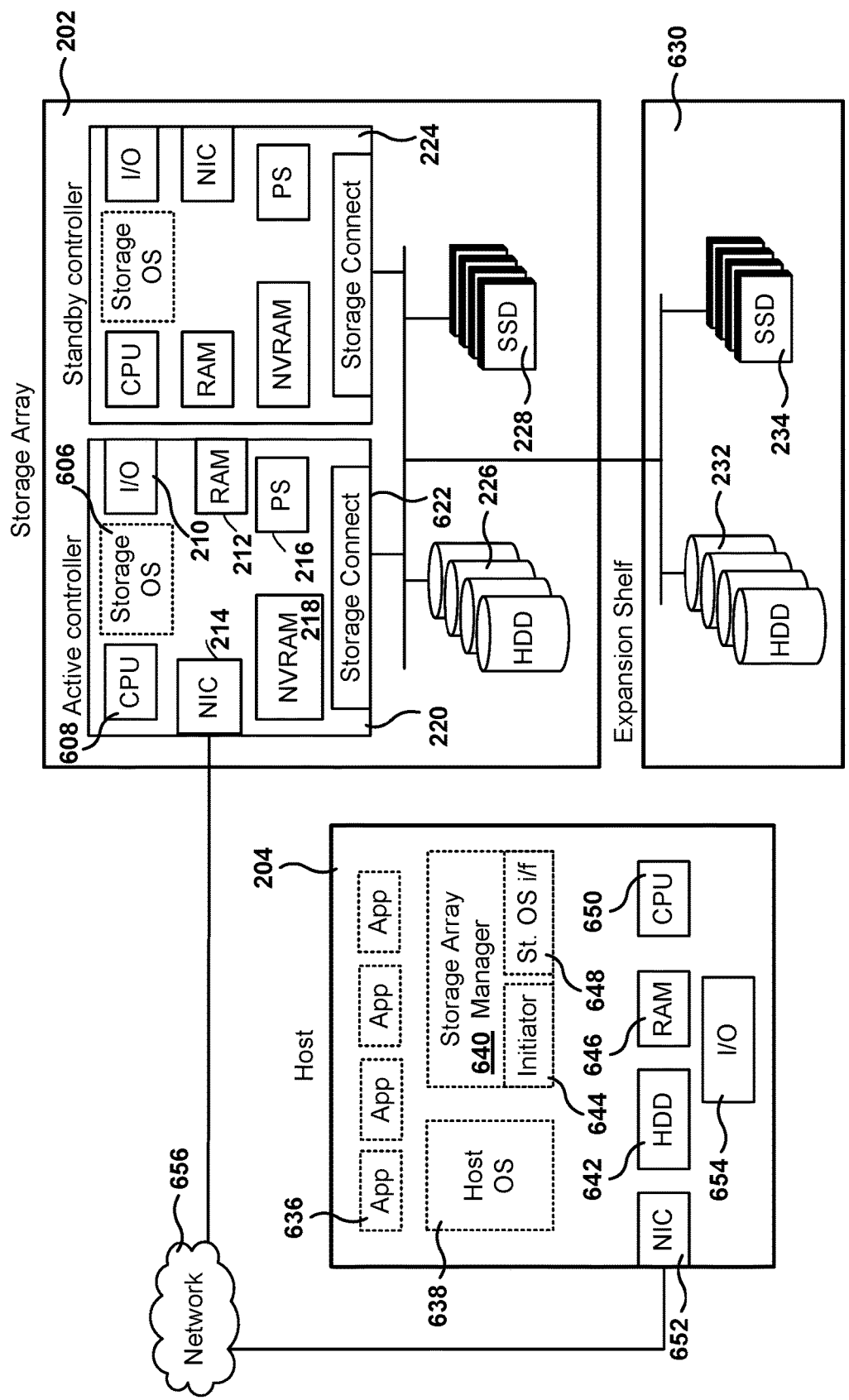
FIG. 6 illustrates an example architecture of a storage array, according to one embodiment.

FIG. 6 illustrates an example architecture of a storage array 102, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

In addition, the active controller 220 further includes CPU 608, general-purpose RAM 212 (e.g., used by the programs executing in CPU 608), input/output module 210 for communicating with external devices (e.g., USB port, terminal port, connectors, plugs, links, etc.), one or more network interface cards (NICs) 214 for exchanging data packages through network 656, one or more power supplies 216, a temperature sensor (not shown), and a storage connect module 622 for sending and receiving data to and from the HDD 226 and SSD 228. In one embodiment, the NICs 214 may be configured for Ethernet communication or Fibre Channel communication, depending on the hardware card used and the storage fabric. In other embodiments, the storage array 202 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 630 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 656, and the storage array 202 stores the sent data or sends back the requested data to host 204.

Host 204 is a computing device including a CPU 650, memory (RAM) 646, permanent storage (HDD) 242, a NIC card 652, and an IO module 654. The host 204 includes one or more applications 636 executing on CPU 650, a host operating system 638, and a computer program storage array manager 640 that provides an interface for accessing storage array 202 to applications 636. Storage array manager 640 includes an initiator 644 and a storage OS interface program 648. When an IO operation is requested by one of the applications 636, the initiator 644 establishes a connection with storage array 202 in one of the supported formats (e.g., iSCSI, Fibre Channel, or any other protocol). The storage OS interface 648 provides console capabilities for managing the storage array 202 by communicating with the active controller 220 and the storage OS 606 executing therein. It should be understood, however, that specific implementations may utilize different modules, different protocols, different number of controllers, etc., while still being configured to execute or process operations taught and disclosed herein.

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted on hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described with reference to FIG. 6, the storage array 202 can include one or more controllers 220, 224. One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access storage 1130, which in one embodiment includes hard disk drives (HDD) 226 and solid-state drives (SSD) 228. As mentioned above, SSDs 228 are utilized as a type of flash cache, which enables efficient reading of data stored to the storage 1130.

As used herein, SSDs functioning as "flash cache," should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 606 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides an increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 606 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228, serving as storage cache, is different than "instruction level processing," which is a common function in microprocessor environments. In one example, microprocessor environments utilize main memory, and various levels of cache memory (e.g., L1, L2, etc). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 606, which can differentiate between the types of blocks being processed for each type of application or applications. That is, block data being written to storage 1130 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 606, for efficient use of flash cache 228.

Continuing with the example of FIG. 6, that active controller 220 is shown including various components that enable efficient processing of storage block reads and writes. As mentioned above, the controller may include an input output (IO) 210, which can enable one or more machines to access functionality of the storage array 202. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 608 is communicating with storage OS 606.

It should be apparent, that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

The invention claimed is:

1. A non-transitory computer readable storage medium comprising instructions executable by a storage array to:
   identify Fibre Channel (FC) cards connected to slots that provide access to a bus of a controller of the storage array;
   identify ports of the FC cards connected to the slots;
   generate a node name for the FC cards connected to the slots of the storage array;
   generate a plurality of port names for the ports of the FC cards, wherein each of the port names are different from one another and include different assigned information; and
   assign the generated node name and the generated port names to the slots, wherein the generated node name and the generated port names remain assigned to the slots when one or more of the FC cards in the slots are replaced.

2. The non-transitory computer readable storage medium of claim 1, comprising instructions executable to store the generated node name and the generated port names in a database managed by the controller of the storage array.

3. The non-transitory computer readable storage medium of claim 1, comprising instructions to assign the generated node name and the generated port names to drivers of the FC cards.

4. The non-transitory computer readable storage medium of claim 3, comprising instructions executable to save the generated node name and the generated port names to a configuration database local to at least one of the FC cards and at least one of the drivers.

5. The non-transitory computer readable storage medium of claim 1, comprising instructions executable to assign the generated node name and the generated port names to the slots such that the generated node name and the generated port names remain assigned to the slots when one of the FC cards in a given one of the slots is replaced with a new FC card in the given one of the slots, and such that the new FC card is to inherit the generated node name and the generated port names that correspond to the given slot into which the new FC card is connected.

6. The non-transitory computer readable storage medium of claim 1, comprising instructions executable to save the generated node name and the generated port names to a global database of the storage array.

7. The non-transitory computer readable storage medium of claim 1, wherein the different assigned information comprises assignment bits that are incrementally different from one another.

8. The non-transitory computer readable storage medium of claim 1, wherein the different assigned information comprises assignment bits based on user input.

9. The non-transitory computer readable storage medium of claim 1, wherein the generated node name is a world wide node name (WWNN) and the generated port names are world wide port names (WWPNs), wherein the storage medium comprises instructions executable to generate the generated node name and the generated port names without utilizing any WWNN or WWPN originally assigned to any of the FC cards.

10. A method for managing name assignments in a Fibre Channel (FC) storage array, comprising:
    generating a port name for a slot of a controller of the FC storage array, the slot of the controller being configured to receive an FC card to provide communication between the FC storage array and an FC fabric;
    binding the generated port name to the slot of the controller, the generated port name being saved to a database managed by the controller;
    assigning the generated port name to the FC card when installed in the slot, wherein the FC card is swappable with another FC card, and wherein the generated port name has assigned bits that remain associated to the slot to enable the FC card to be swapped with the other FC card, while maintaining the generated port name that was generated for the slot.

11. The method of claim 10, wherein the generated port name is generated by the controller of the storage array.

12. The method of claim 10, wherein the generated port name is generated based on user input enabling a custom name for the generated port name.

13. The method of claim 10, wherein assigning the port name to the FC card, when the FC card is installed in the slot of the controller, is performed by a FC driver of the storage array.

14. The method of claim 10, wherein the port name is a world wide port name (WWPN).

15. The method of claim 10, wherein the binding maps the port name to the slot, and the slot provides access to a bus of the controller.

16. A storage array, comprising:
a controller of the storage array configured for Fibre Channel (FC) operation, the controller having a slot for receiving a FC card, the FC card configured to enable network communication between the storage array and a FC fabric, the controller being associated with a driver that manages assignment of a port name for the slot;
wherein the controller is to generate a port name having assigned bits and assign the generated port name to the slot such that the generated port name is to override an original port name assigned to the FC card and remain assigned to the slot when the FC card is swapped with other FC cards, wherein the storage array is to use the generated port name for each of the FC card and the other FC cards, when inserted into the slot of the controller.

17. The storage array of claim 16, wherein the port name is a World Wide Port Name (WWPN).

18. The storage array of claim 16, wherein the generated port name is generated by the controller of the storage array.

19. The storage array of claim 16, wherein the generated port name is generated based on user input enabling a custom name for the generated port name.

20. The storage array of claim 16, wherein the controller is to ignore the original port name assigned to the FC card when generating the generated port name.

* * * * *